F. GRIFFIN.
TRACTOR FOR PLOWS AND CULTIVATORS.
APPLICATION FILED FEB. 10, 1913.
1,158,680.
Patented Nov. 2, 1915.
3 SHEETS—SHEET 1.
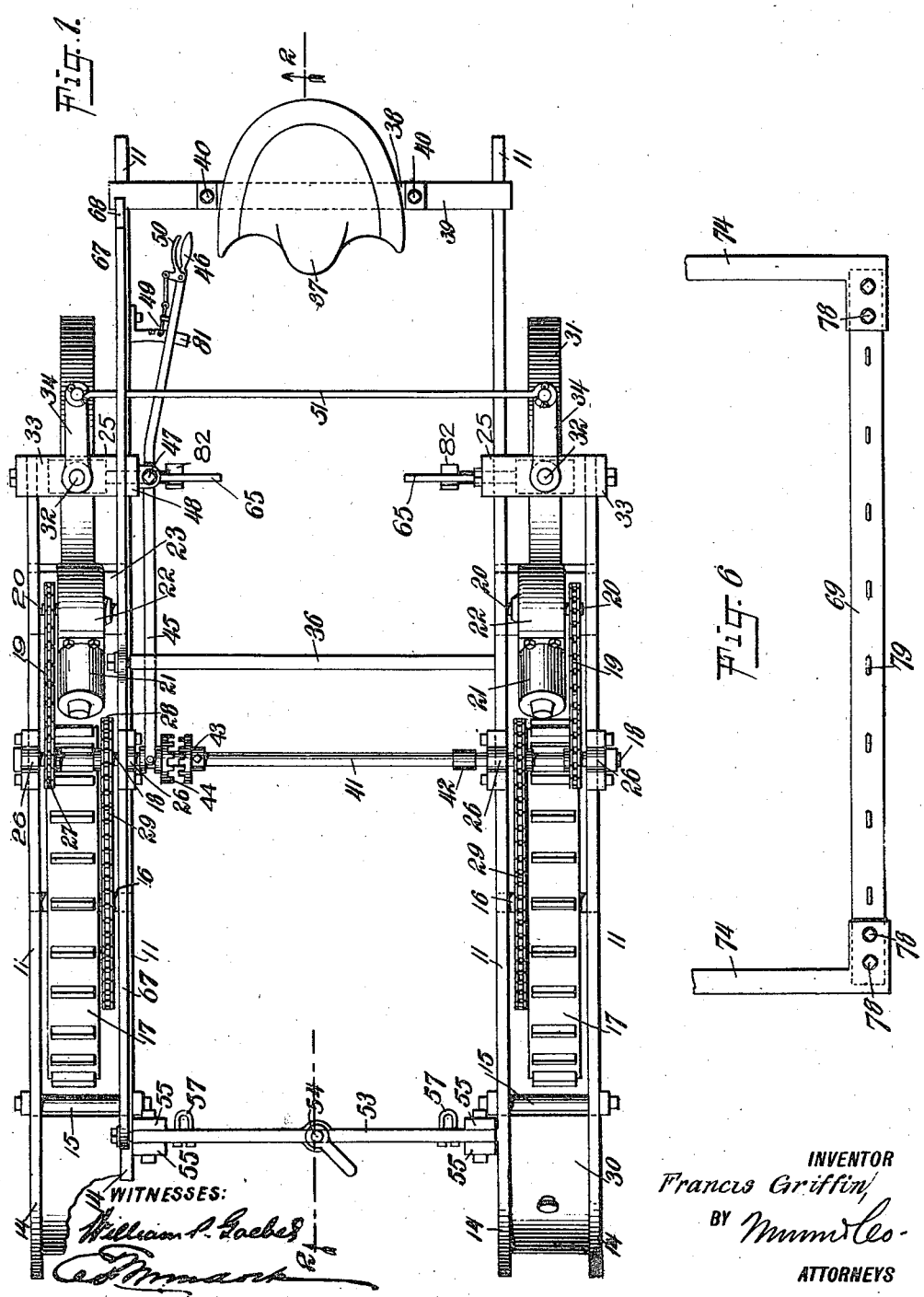
INVENTOR
Francis Griffin F. GRIFFIN.
TRACTOR FOR PLOWS AND CULTIVATORS.
APPLICATION FILED FEB. 10, 1913.
1,158,680.
Patented Nov. 2, 1915.
3 SHEETS—SHEET 2.
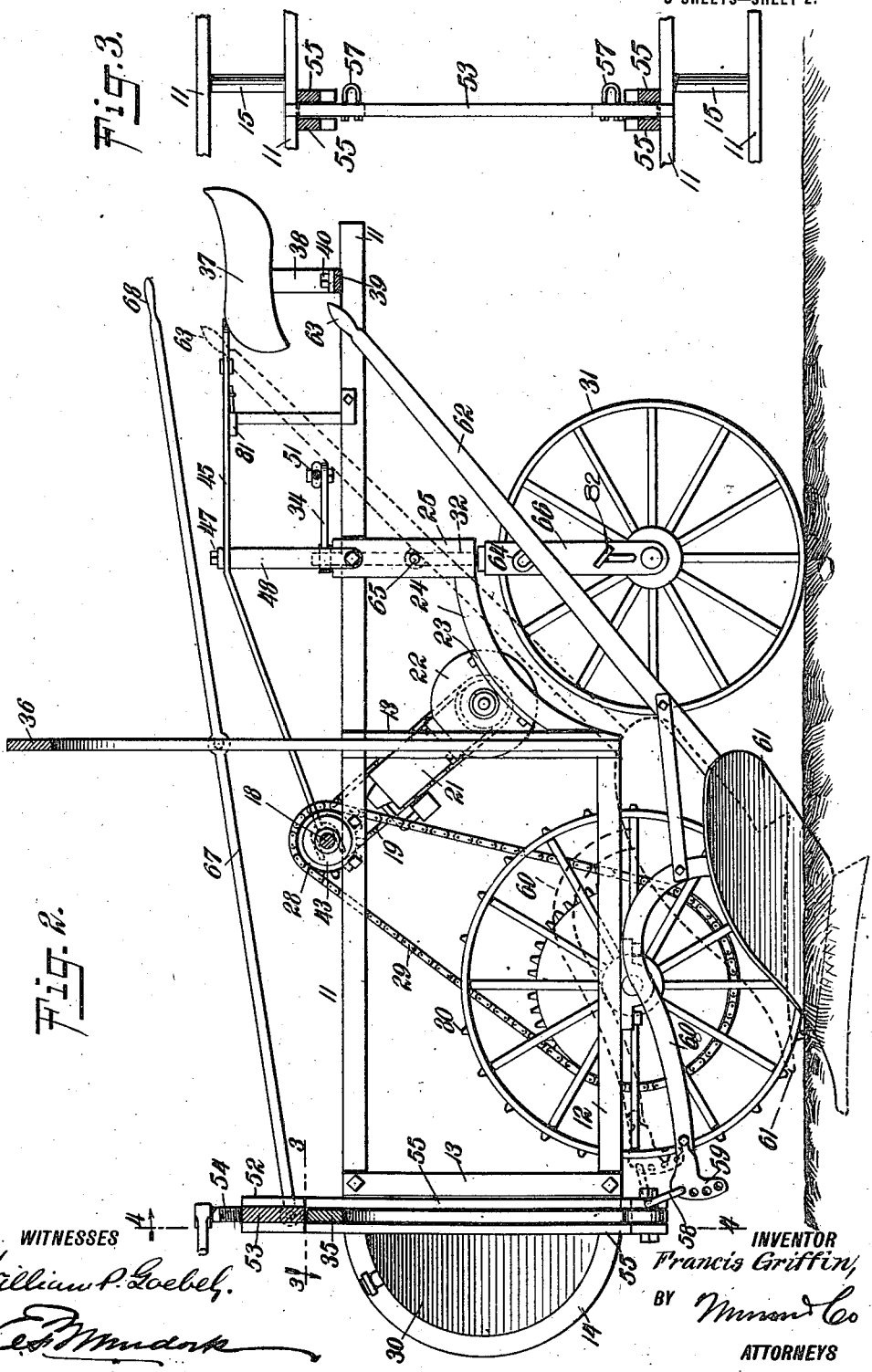

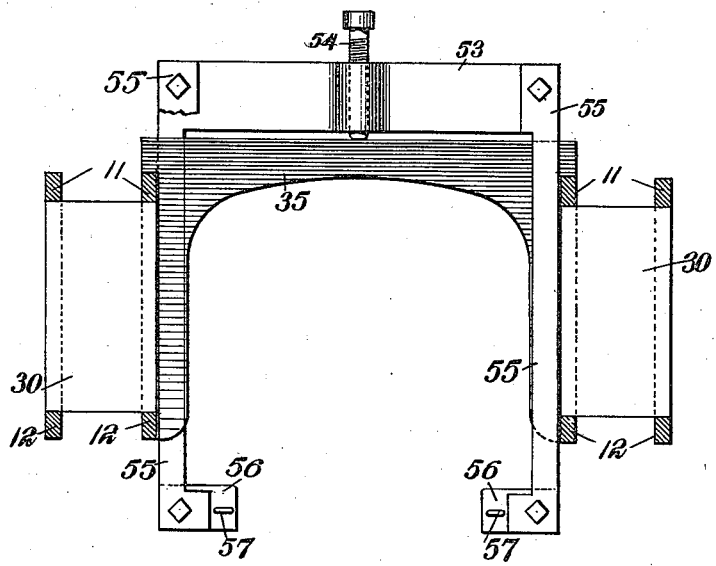
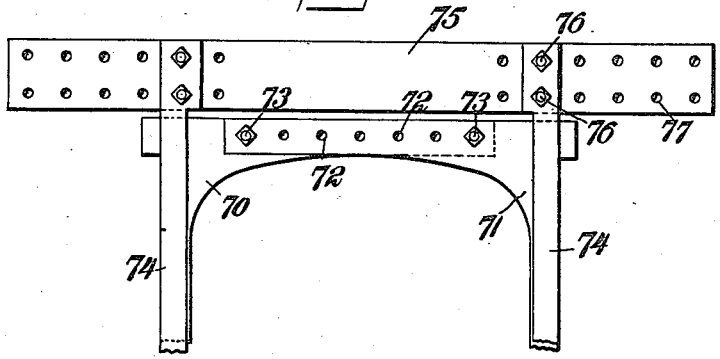

UNITED STATES PATENT OFFICE.

FRANCIS GRIFFIN, OF GREENVILLE, MISSISSIPPI.

TRACTOR FOR PLOWS AND CULTIVATORS.

1,158,680.

Specification of Letters Patent.

Patented Nov. 2, 1915.

Application filed February 10, 1913. Serial No. 747,344.

*To all whom it may concern:*

Be it known that I, FRANCIS GRIFFIN, a citizen of the United States, and a resident of Greenville, in the county of Washington and State of Mississippi, have invented a new and Improved Tractor for Plows and Cultivators, of which the following is a full, clear, and exact description.

Among the principal objects which the present invention has in view are: To provide a tractor having separable driving sections to accommodate the variations in the area of the ground being worked; to provide means for supporting one or more plows on a riding frame having manipulating devices connected therewith whereby the working position of each plow may be varied; to provide means for steering the tractor; and to provide a construction for a tractor which is simple, efficient and durable.

Reference is to be had to the accompanying drawings forming a part of this specification, in which similar characters of reference indicate corresponding parts in all the views, and in which—

Figure 1 is a top plan view of the tractor constructed and arranged in accordance with the present invention, the plows or cultivators being removed; Fig. 2 is a vertical longitudinal section taken on the line 2—2 in Fig. 1, a plow being shown in this view in connection with the tractor; Fig. 3 is a horizontal section of a fragment of the fore part of the frame, the section being taken on the line 3—3 in Fig. 2; Fig. 4 is a detail view in cross sectional elevation taken on the line 4—4 in Fig. 2; Fig. 5 is a detail view in front elevation showing a modified form of a lifting frame and supporting arch therefor, the frame being adapted for lateral expansion; Fig. 6 is a detail view on an enlarged scale, showing the spreader bar employed in conjunction with the adjustable lifting frame shown in Fig. 5.

The tractor is primarily formed by the union of two separable and if desired, independent motor elements. Each element is mounted in an independent frame having side framing bars 11 and 12. The framing bars 11 and 12 are joined by vertical struts 13 and forward bows or curved sections 14. The frames having the bars 11 and 12, struts 13 and sections 14, are connected by cross tie bolts 15, axles 16 of a traction wheel 17 and a counter-shaft 18, which is connected by means of a driving chain 19, to the crank shaft 20 of a motor 21. The motors 21 are suitably mounted between the sides of said frames, the crank cases 22 thereof being provided with bolting plates 23, which are made fast to the structural arches 24 forming in part the rear portion of the frames. The arches 24, at the forward lower end, are connected to the bars 12. The rearward upper ends of said arches are connected to struts 25, which unite said arches and the upper framing bars 11, as best seen in Fig. 2 of the drawings.

The counter-shafts 18, which extend between the sides of the frames, are mounted in bearings formed in standards 26. They are furnished with sprocket wheels 27 and 28, said wheels being respectively operatively connected by means of the chains 19 and chains 29, with the crank shafts 20 of the engines and the axles 16 of the traction wheels 17.

Any suitable and conventional mechanism for operating and controlling the motor 21 may be employed. The said operating and controlling devices are omitted in the present drawings to simplify the illustration. The form of motor preferred is that known as an internal combustion engine, and when this form of engine is used, the gasoline or other liquid fuel used therein is carried in a tank 30, which is held between the sides of the frame and between the struts 13 and the bows or curved sections 14 of each frame. The frame thus constructed is carried by the traction wheel 17 and a caster wheel 31. The caster wheel 31 is provided with a key-bolt 32, which is journaled in cross braces 33, and at the upper end of which is a tiller arm 34.

It will be understood, the motor element thus far described is in the completed structure duplicated. However, each element is capable of independent operation. As usually employed, the two frames are connected by rigid arches 35 and 36 opening downward, and are each rigidly connected to the frames and to the side bars 11 and 12 thereof. The arch 35 is lower than the arch 36, to avoid interference with the view of the driver when resting upon the seat 37. The seat 37 is mounted upon a spring 38, the ends whereof are supported upon a cross bar 39, being held by bolts 40. The cross bar 39 thus assists in steadying the tractor frame, the frame bars 11 being elongated rearwardly to support said cross bar. The counter-shafts 18 are coupled by a connecting shaft 41. The shaft 41 is provided with a suitable connecting collar 42 and a truncated crown clutch wheel 43 fixedly mounted on said shaft.

The end of one of the counter-shafts 18 is provided with a movable clutch member 44, said member being keyed to said counter-shaft and slidable thereon to and from the clutch wheel 43 by means of a lever 45, the operating handle 46 whereof is disposed adjacent the seat 37. The lever 45 is fulcrumed on a bolt 47 in the end of an upwardly-extended post 48. The lever 45 is held in adjusted position by a latch bolt 49, which is provided with a hand grip 50 to release the bolt from engagement with the teeth of a quadrant 81 mounted on the side frame of the tractor.

When the clutch member 44 engages the wheel 43, the shafts 18 and transmission gears connected therewith are operated in unison. When the member 44 is disengaged from the wheel 43, said shafts 18 and transmission members connected therewith are free to independently operate. In this manner provision is made whereby, by discontinuing the operation of one of the motors 21, the wheel 17 on the arrested side of the tractor operates as a pivot on which the tractor as a whole turns, being impelled thereto by the operation of the motor on the opposite side of the tractor. When thus turning the tractor, the wheels 31 trail into line in the same manner as ordinary caster wheels. When it is desired to steer the machine by means of the wheels 31, and when the frames are coupled in the manner above described, the arms 34 are connected by a link bar 51. This link bar 51 may be operated by the driver to shift the wheels and thereby steer the machine.

The arch 35 operates as a guide for a supporting frame 52. The supporting frame 52 consists of a top cross bar 53, in which is pivotally mounted a heavy jack screw 54. The end of the jack screw 54 is directly on the crown of the arch 35, and by the manipulation of said screw the supporting frame is raised and lowered upon said arch.

Depending from each side of the cross bar 53, to flank the side of the arch 35, are legs 55, between the lower ends of which are mounted eyelet plates 56. The plates 56 are each provided with an eyelet 57, to be engaged by a link hook 58, which is suitably attached to a clevis 59, with which the beam 60 of a plow is provided.

When the supporting frame having the short bar 53 and the plates 56 is employed, provision is made for the operation of two plows. As shown in Fig. 2 of the drawings, the plow 61 is of conventional manufacture except that the handle 62 thereof is elongated and is provided with grips 63 disposed adjacent the seat 37 of the driver.

In the operation of plows, by means of the tractor herein described, provision is made for carrying the plows to and from the field of operation. To accomplish this, the plow handle 62 and plow connected therewith are lifted to the position shown in dotted lines in Fig. 2 of the drawings. To support the plow 61 in its various positions, the handle 62 is furnished with an eyelet 64 to fit one of the pins 65, mounted on the strut 25. On the yokes 66 are mounted the steps 82 for climbing to the seat 37. When the handle 62 is suspended from the pin 65 on the strut 25, as shown in dotted lines in Fig. 2, the plow is raised clear off the ground, and in this manner the tractor may be operated as a vehicle or carrier to move the plow or other tool to and from the field of operation. If it is desired to further lift the plow or tool, this is accomplished by manipulating the lever 67, the hand-grip 68 whereof is adjacent the seat 37. The forward end of said lever is pivotally connected with the supporting frame of the implements. The said supporting frame is guided by the arch 35. It will be understood that by manipulating the handle 62 and lever 67, the depth and pitch of the plow may be regulated, and this without necessitating the dismounting of the rider from the seat 37.

It will be understood that the tractors or single traction units above described are operatively connected in paired arrangement, employing for that purpose the rigid arch 35 or an expansible arch formed by two sections designated in the drawings by the numerals 70 and 71.

When employing the spreader bar 69, shown as a modified form in Fig. 6 of the drawings, the modified form of supporting frame and the arch therefor shown in Fig. 5, are employed. The said arch shown in Fig. 5 comprises two sections 70 and 71. The sections 70 and 71 have lapped extensions in which are placed bolt-holes 72. In the bolt-holes are disposed bolts 73. When the sections 70 and 71 are properly adjusted, the legs 74 are adjusted lengthwise on the cross bar 75, to which they are rigidly attached by bolts 76 disposed in the bolt-holes 77 of said bar.

The spreader bar 69 is secured rigidly between the lower ends of the legs 74 by bolts 78, and is provided at intervals with eyelets 79, to each of which may be attached a plow, by means of a link hook, such as the hook 58 shown in Fig. 2 of the drawings.

In the above-described manner, the tractor may be employed to operate gangs of plows or similar implements. It will be understood that when the tractor is employed for operating a number of implements, the same manipulation of the parts ensues as above described with reference to the manipulation or control of the two implements. Likewise, it is true that the tractor may be employed for operating one only of the plows or implements.

The arch shown in Fig. 4 of the drawings I find advantageous for use for cultivating cotton. When the very wide arch as shown in Fig. 5 is employed I use a series of right and left gang plows. To provide the wheels 17 with sufficient grip of the ground over which they move, said wheels are furnished with peripheral calks 80 of usual form and construction.

It will be understood that while the implement herein shown has been described with reference to its service as a tractor for plows and similar agricultural implements, it may be employed as a portable power plant, the service of which may be to operate the usual farm machines. When in this service, the chains 29 will be removed, and the shaft 41 be furnished with a driving pulley from which power could be transmitted by a suitable belt to a counter-shaft on a standing structure.

Having thus described my invention, I claim as new and desire to secure by Letters Patent:—

1. A tractor of the character mentioned, comprising a plurality of motor-driven frames; a connective structure removably engaging said frames; a spreader bar operatively connecting said frames and adapted for attaching plows in gang arrangement; a transmission shaft operatively connecting the motors on said frames; and a manually-operated clutch for operatively connecting said shaft and one of said motors.

2. A tractor of the character mentioned, comprising a plurality of motor-driven frames; an expansible connective structure removably engaging said frames, said structure being provided with means for attaching agricultural implements to follow between the paths of said frames; and means carried on said frames for lifting and lowering the point of attachment of said implements.

3. A tractor as characterized, comprising a plurality of relatively narrow, vertical, unit tractor frames, each frame having a traction wheel and a steering wheel normally traveling in the same path; a connecting structure between said frames to hold the same in parallel arrangement; a driver's seat disposed on said connecting structure between said frames; a connecting, synchronizing member between said frames for synchronizing the operation of said traction wheels; and a plurality of motors, one mounted on each of said tractor frames and operatively connected with said traction wheels.

4. A tractor as characterized, comprising a plurality of relatively narrow, vertical, unit tractor frames, each frame having a traction wheel and a steering wheel normally traveling in the same path; a connecting structure between said frames to hold the same in parallel arrangement; a driver's seat disposed on said connecting structure between said frames; a connecting, synchronizing member between said frames for synchronizing the operation of said traction wheels; a plurality of motors, one mounted on each of said tractor frames and operatively connected with said traction wheels; and means, manually operative from the driver's seat, for controlling the operation of the motors and traction wheels of said frames independently.

5. A tractor as characterized, comprising a plurality of relatively narrow, vertical, unit tractor frames, each frame having a traction wheel and a steering wheel normally traveling in the same path; a connecting structure between said frames to hold the same in parallel arrangement; a driver's seat disposed on said connecting structure between said frames; a connecting, synchronizing member between said frames for synchronizing the operation of said traction wheels; a plurality of motors, one mounted on each of said tractor frames and operatively connected with said traction wheels; means manually operative from the driver's seat, for controlling the operation of the motors and traction wheels of said frames independently; and suspension means for maintaining an agricultural implement between said tractor frames.

In testimony whereof I have signed my name to this specification in the presence of two subscribing witnesses.

FRANCIS GRIFFIN.

Witnesses:
S. A. BRANTON,
WM. WYUHART.